United States Patent
Blanco et al.

(10) Patent No.: US 7,222,248 B2
(45) Date of Patent: May 22, 2007

(54) METHOD OF SWITCHING VOLTAGE ISLANDS IN INTEGRATED CIRCUITS WHEN A GRID VOLTAGE AT A REFERENCE LOCATION IS WITHIN A SPECIFIED RANGE

(75) Inventors: Rafael Blanco, Essex Junction, VT (US); John M. Cohn, Richmond, VT (US); Kenneth J. Goodnow, Essex Junction, VT (US); Douglas W. Stout, Milton, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 10/906,476

(22) Filed: Feb. 22, 2005

(65) Prior Publication Data
US 2006/0190744 A1 Aug. 24, 2006

(51) Int. Cl.
*G06F 1/26* (2006.01)
*G06F 11/30* (2006.01)

(52) U.S. Cl. ............... 713/300; 713/320; 713/324; 713/340; 714/14; 714/22

(58) Field of Classification Search ............... 713/300, 713/320, 324, 340; 714/14, 22
See application file for complete search history.

(56) References Cited

U.S. PATENT DOCUMENTS

| | | | |
|---|---|---|---|
| 5,420,808 A * | 5/1995 | Alexander et al. ......... 713/321 |
| 6,137,188 A | 10/2000 | Mitchell et al. |
| 6,577,535 B2 | 6/2003 | Pasternak |
| 6,762,629 B2 * | 7/2004 | Tam et al. .................. 327/114 |
| 6,848,055 B1 * | 1/2005 | Yarch ......................... 713/300 |
| 2003/0080741 A1 * | 5/2003 | LeRow et al. ............. 324/320 |
| 2003/0126477 A1 | 7/2003 | Zhang |
| 2003/0188210 A1 * | 10/2003 | Nakazata .................... 713/320 |

* cited by examiner

*Primary Examiner*—Chun Cao
*Assistant Examiner*—Mark Connolly
(74) *Attorney, Agent, or Firm*—W. Riyon Harding

(57) ABSTRACT

An integrated circuit has a power grid and a set of independently switchable voltage islands, together with a system and method for measuring the voltage and history of the voltage on the power grid to determine the correct time to allow a large capacitive load (such as a voltage island) to be switched on to or off the power grid.

20 Claims, 6 Drawing Sheets

US 7,222,248 B2

METHOD OF SWITCHING VOLTAGE ISLANDS IN INTEGRATED CIRCUITS WHEN A GRID VOLTAGE AT A REFERENCE LOCATION IS WITHIN A SPECIFIED RANGE

TECHNICAL FIELD

The field of the invention is that of integrated circuits, in particular circuits having separate blocks that can be turned on or off separately from other portions of the circuit.

BACKGROUND OF THE INVENTION

With the advent of independent voltage islands on integrated circuits (especially ASICs) and the potential to turn on and off these voltage islands as performance, power, and heat require, the problem exists of how to turn on and off the power without disrupting the voltage supply to other sections of the integrated circuit.

When a voltage island is turned on or off, a part of the integrated circuit has either the power turned on or turned off. This means that the power grid of the circuit has a capacitive load either connected or disconnected from the grid. This causes the power grid voltage level to bounce around. Usually this variation can be represented by a decaying sinusoidal waveform.

In FIG. 1, the curve 105 shows the voltage level close to the point that the power is switched on or off. In this example, line 100 represents the nominal voltage and line 110 represents a high voltage limit that will significantly impact other portions of the circuit, either by providing incorrect results, changing timing, etc. Arrow 120 indicates a rapidly varying period when a switch may put the voltage out of range. Arrow 130 represents a sub-range when the voltage is falling rapidly. A switch at this time that decreases the voltage may put it out of range, but a switch that increases the voltage will tend to reduce the effect of the rapid decrease.

Those skilled in the art will appreciate that a switch in the period indicated by arrow 120 may either increase or decrease out of range excursions, but that the voltage is changing on a very fast time scale and it is risky to switch another island so soon after the switch that produced curve 105.

As multiple voltage islands are switched on and off, performance requirements change within the integrated circuit. These sinusoidal decaying voltage levels from the various voltage islands are added together. This results in a voltage level that varies over time and is dependent on performance requirements and capacitive loads such as voltage islands being switched on and off the grid. The curve in FIG. 1 has been selected for ease in explanation to show the response of the grid to a single switching incident.

In the past this voltage level (either too high or too low) was handled by evaluating the worst case performance requirements and then over specifying a voltage grid structure that would guarantee that the voltage would stay within limits.

This problem has changed with the advent of voltage islands. The use of power switchable voltage islands means that the capacitive load of a major portion (⅓, ¼, ½, ⅕, etc.) of the integrated circuit could be switched at a given time. Trying to over specify/design the power grid to handle these fluctuations would be too costly in terms of area used for bypass capacitances and wiring layout.

Assuming that a more sophisticated approach of selecting the time and/or quantity of load to be switched is available, the problem arises of choosing parameters that represent a reasonable tradeoff between resource use and performance.

The art could benefit from a method of selecting parameters to permit or forbid a switch that provides an acceptable degree of circuit protection while consuming a tolerable amount of system resources.

SUMMARY OF THE INVENTION

The invention relates to an integrated circuit having a distributed voltage measurement and monitoring system across multiple points of a power grid whereby a determination is made as to the instantaneous voltage relative to a voltage target range and a history of the instantaneous voltages can be provided.

A feature of the invention is a set of isolated voltage islands that may have their power switched on or off, and a method of timing the switch to reduce the effect on other islands in the circuit.

A feature of the invention is a system that is able to monitor the voltage grid and determine the immediate past history of the grid to predict the future voltage on the grid. Being able to predict the future grid voltage allows a decision to be made when to switch on and off the voltage island.

A feature of the invention is that, when the integrated circuit calls for an island to be switched, the power control system of the circuit will delay the switch (the delay time may be zero) until the predicted disturbance and adverse effect on other voltage islands is acceptable.

A feature of the invention is the provision of a set of measurement modules having a sensor means for determining the current grid voltage and storage for storing the value of the grid voltage to provide a past history of the grid voltage at that location.

Another feature of the invention is that the system is then linked together by a communication system. The information from each of the measurement locations is transmitted to a control unit and the information is used to determine a decision point

DETAILED DESCRIPTION

Figure 2:
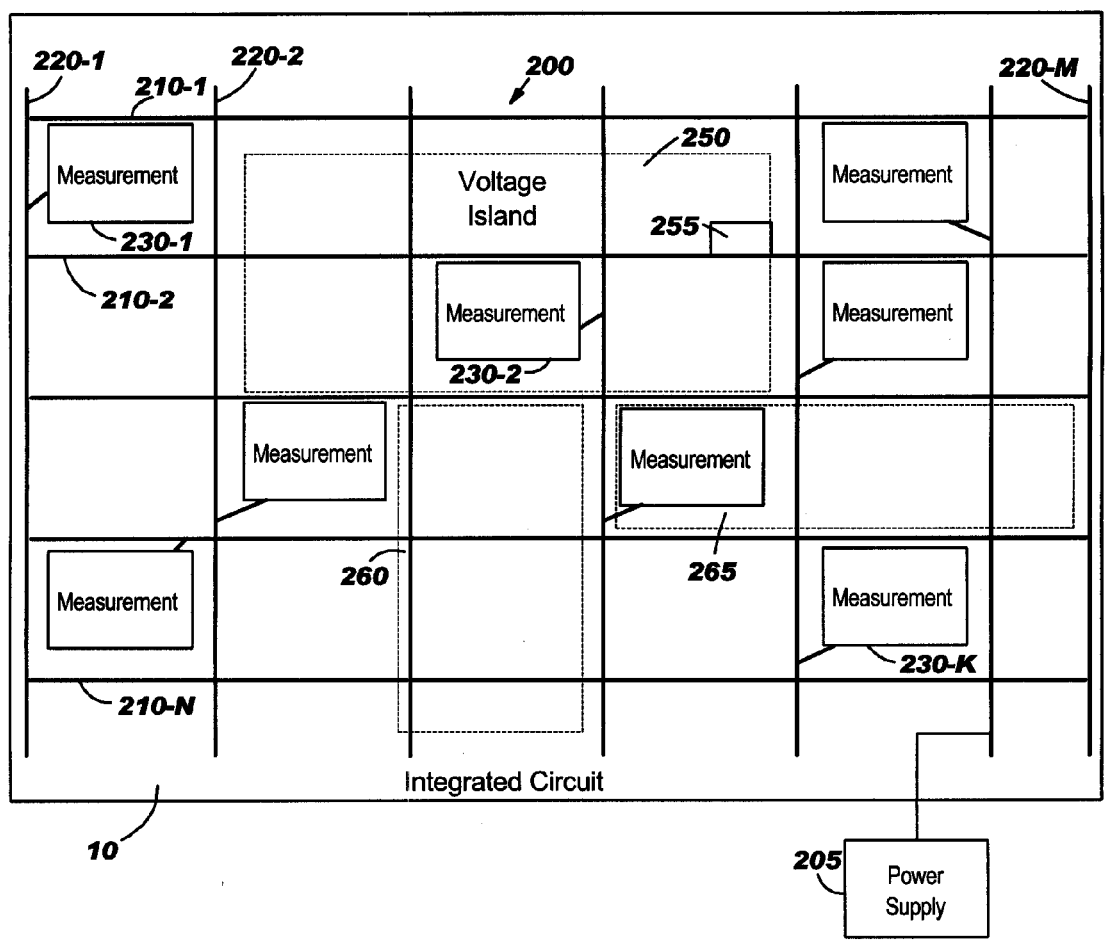
FIG. 2 shows a voltage distribution grid on an integrated circuit.

FIG. 2 illustrates schematically a top view of an integrated circuit 10 employing the invention.

A grid 200 has vertical members 220-1 through 220-M and horizontal members 210-1 through 210-N. The grid is fed by power supply 205. At the top center of the Figure, voltage island 250 represents a portion of the circuit that can be connected to the grid (e.g. line 210-2) through controllable switch 255, so that the voltage island is independently switchable—i.e. it can be switched on or off independently of the rest of the circuit.

Neighboring islands 260 and 265 are also shown. The purpose of the invention is to switch one island, 250 say, at a time such that the voltage applied to islands 260 and 265 is within the specified range for proper operation in spite of the effect of switching island 250. For convenience in exposition, unless otherwise specified, the term grid voltage and similar terms will mean the grid voltage at a reference point that preferably is the most sensitive—i.e. the island most likely to malfunction when the voltage is out of the specified range.

Figure 1:
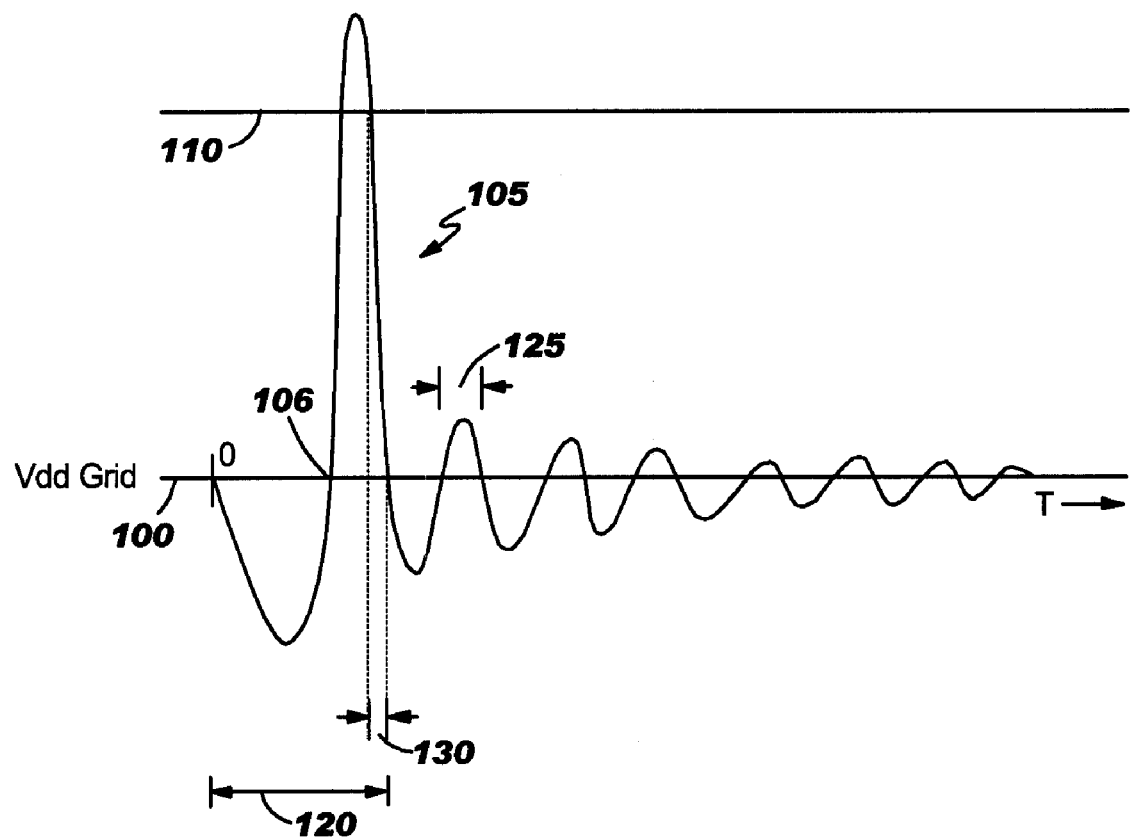
FIG. 1 shows the effect of a change in a voltage island.

Those skilled in the art will appreciate that, if island 250 is switched when the curve of FIG. 1 is within the range denoted by arrow 120 (because of some previous voltage event), the voltage may be raised above the limit of line 110. Arrow 120 is picked to illustrate a range when the value of the voltage is at its highest or lowest point and/or when the first derivative of the voltage is at a maximum value.

In order to select the proper switching time to switch island 250, it is necessary to know the current voltage and the history of the voltage. Those skilled in the art will appreciate that, if island 250 is turned off and dumps a large charge on the grid at a time when the voltage is at or near the limit, the extra change will raise the value of the voltage even higher. Similarly, if the switch occurs when the voltage is in the right hand region of curve 105 in FIG. 1, where the deviation from the nominal value is small, it will be safe to make the switch immediately.

Arrow 125 in FIG. 1 indicates a region where the slope of the curve is low. It is evident that, in this example, this region is relatively small and easy to miss.

It will be evident to those skilled in the art that, in order to select the best time to make a switch, it is necessary to know the current voltage value and also the history of the voltage value. For example, if only the current value is known, the point 106 at the start of the highest voltage peak would be considered acceptable because the current value of voltage is close to the nominal value.

A set of measurement modules 230-1 through 230-K measure the voltage on the grid at various locations. The measurement modules will contain a conventional voltage sensor that measures the voltage and storage means that stores the voltage value of the measurement.

Illustratively, the storage means is a stack register, but any other arrangement that will store sequentially a series of N values taken from the voltage sensor will be suitable. For example, the register might be structured as a FIFO register.

The measurement section must satisfy the following requirements:

It must be able to determine the past history of the voltage at that physical location.

It must be able to determine the current voltage at the physical location.

It must be physically small enough that it can be used in many locations.

It must be able to respond within a required time.

For example, if it is necessary for proper circuit operation that the voltage be recorded with a granularity of one clock cycle because an error will be made if the voltage is out of range for a single clock cycle, then the measurement section must respond fast enough to measure and store the data within that time.

Figure 3:
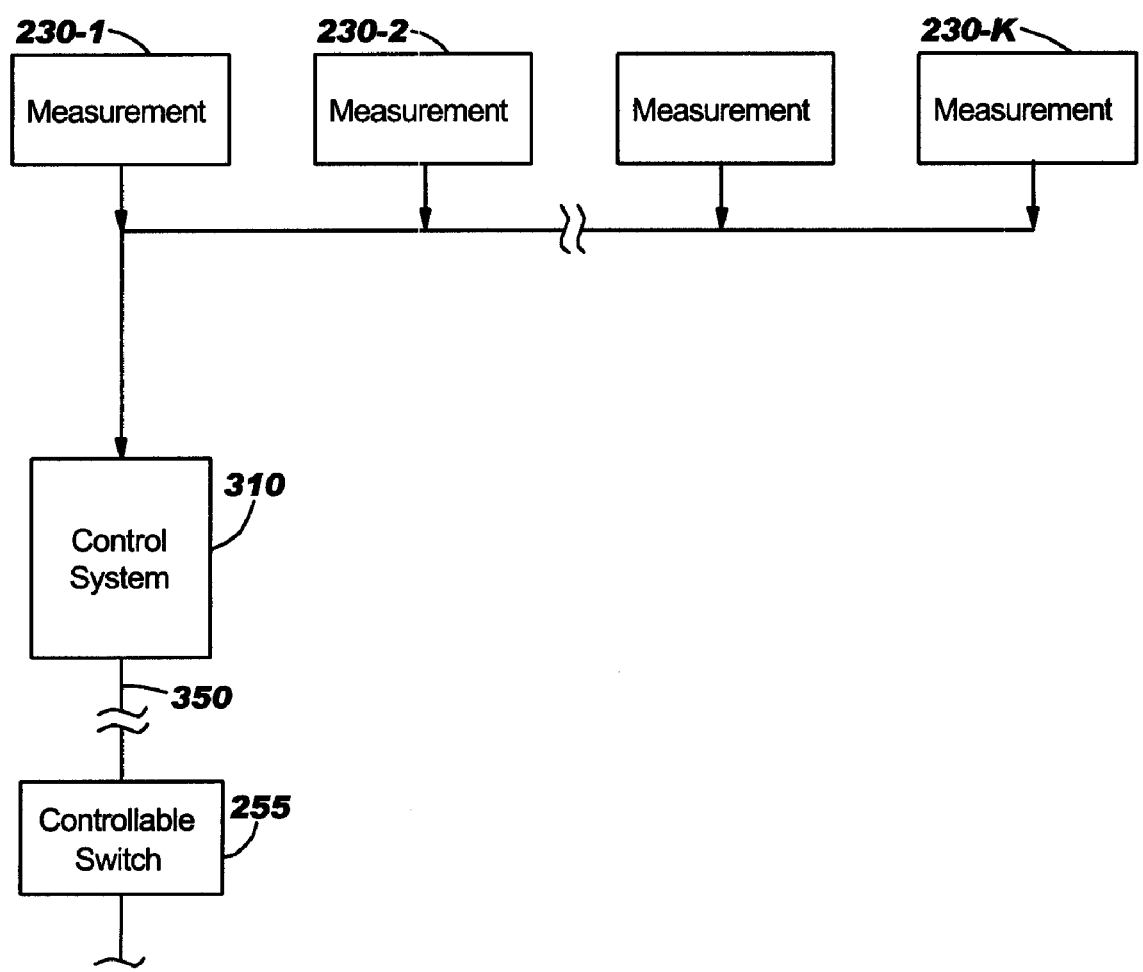
FIG. 3 shows a schematic view of a control system.

FIG. 3 illustrates the overall system for carrying out the control function. A set of measurement modules 230-1 through 230-K from FIG. 2 communicate with a controller 310, which contains data processing modules to carry out the functions described herein. At the bottom of controller 310, line 350 goes to the various controllable switches 255 that switch the individual islands 250, 260, 265, etc. on and off. Controller 310 may be on-chip or off. Portions of the functions of controller 310 may be time-shared with portions of the circuit itself, subject to the usual constraints that the circuit has to meet its specifications and may not be able to pause in its operations to allow a module to be used for the voltage control functions performed by controller 310.

Figure 4:
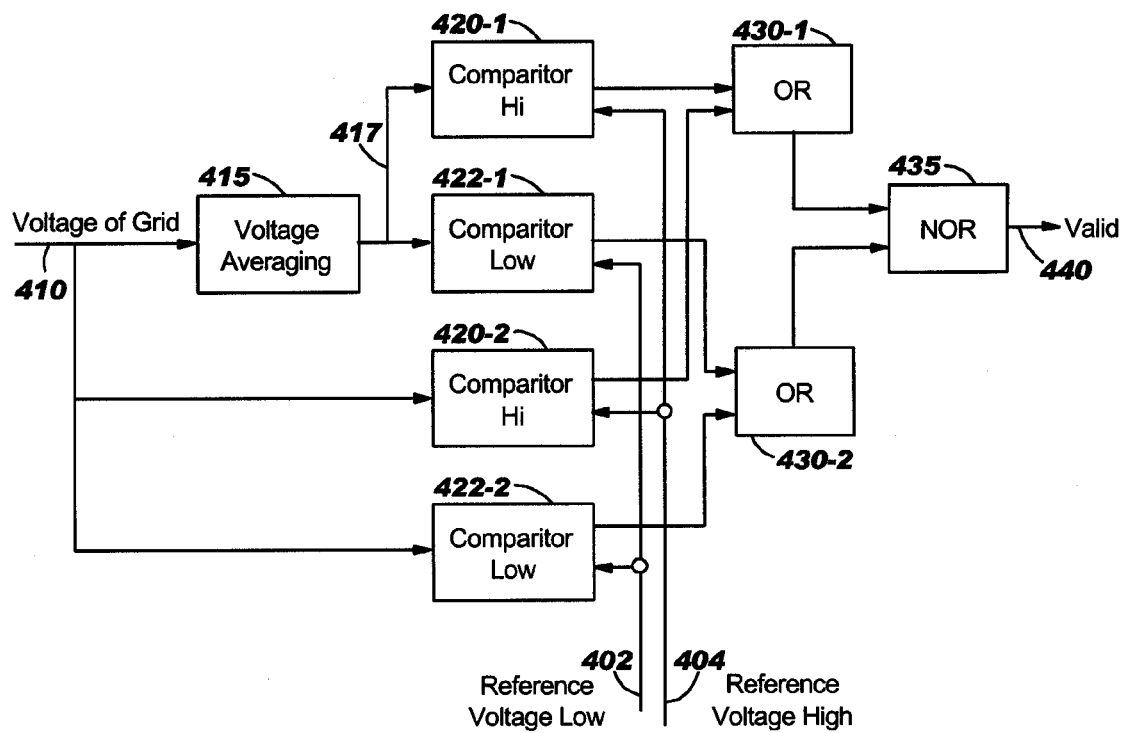
FIG. 4 shows a block diagram of a circuit that tests for a valid switching condition.

FIG. 4 illustrates a preferred version of the measurement system. The voltage comes in on the left and is sampled through a conventional integration circuit 415, well known to those skilled in the art. By utilizing an analog integration (voltage averaging) circuit, the history of the voltage can be determined.

Voltage averaging circuit 415 effectively determines the history of the voltage values for some N periods of time previous to the decision point. This averaged voltage value passes on line 417 to comparators 420-1 and 422-1 that compare the average value with high and low reference voltages, respectively. Similarly, the current Grid voltage is simultaneously put through separate comparators 420-2 and 422-2 and compared to a reference voltage.

The reference voltage could be fixed or adjustable depending on the application. The reference voltages are the voltage range at which a successful turn-on or turn-off can be accomplished. In this example, the reference values for the average and for the current values are the same. This need not always be the case, and the reference values could be different for current and average voltages.

The Hi comparators check to see if the averaged voltage or current voltage is lower than the upper range of the reference voltage range. Each comparator puts out a logic 1 if the input voltage is out of range and a logic 0 if the input is within range. The Low comparators check to see if the averaged voltage or current voltage is higher than the low reference voltage. The current and average high results are then ORed together in OR 430-1 to determine if both the current and average results are less than the Hi limit (output low if both inputs are low, i.e. within range). Similarly, the current and average low results are also ORed together in OR 430-2 to determine if both the current and average results are greater than the Low limit (output low if both inputs are low, i.e. within range). If the output of both OR circuits 430-1 and 430-2 is logic 0, the output of NOR 435 will be logic 1 indicating that a valid switch is possible.

The circuit of FIG. 4 performs satisfactorily when the voltage is similar to that shown on the right side of FIG. 1; i.e. when both the current value is within range and when the average value indicates that the voltage has been within range for a while. This circuit will accept some situations in the range 120 because it does not predict well. For example, at point 106, the average will be within range because the initial dip is within range. The voltage is about to go out of range and this is the worst time to make a switch that will increase the grid voltage. (Conversely, it is a good time to make a switch that will decrease the grid voltage.)

The performance of this circuit can be increased by using a separate lower reference value for the average comparators that will pick up the initial excursion in curve 105 of FIG. 1. The circuit can be used as an initial filter to reject times when a switch is too risky.

This problem of predicting a good time to switch an island becomes more complicated when we take into account: a) the physical location of the voltage island to be switched, b) the physical location of the measurements and c) voltage fluctuations on the time scale of FIG. 1. Those skilled in the art are aware that the grid is more like a contour map of voltage and the physical location of the voltage island may require that multiple measurement location results be taken into account before deciding if a switch is okay; i.e. the sensitivity of other islands and the recent history of the grid voltage will affect the permissible time of switching the kth island. In addition, as described above, a difference in time of less than a clock cycle can mean the difference between pushing the voltage out of range and suppressing out of range excursions.

The measurement system shown in FIG. 4 is simple in terms of the history of the voltage grid at the measurement point. A more sophisticated system could determine the ringing state of the voltage waveform by tracking the various averaged and current voltage measurements, and then manipulating these values to determine the longer term history of the voltage grid. Since the measurement system above creates valid or non-valid outputs as well as the comparators, these values could be treated digitally and then digitally processed.

An example is shown below, in which a set of recorded measurements starts with the earliest time on the left:

History: 0 0 1 1 1 1 0 1 1 0 1 0 0
Current High: 0 0 0 1 1 0 0 1 0 0 0 0 0
Current Low: 0 1 1 0 0 0 1 0 0 1 0 0 0

This set of data shows a decaying oscillating waveform. The information can be seen in the History line where a grid voltage out of bounds (represented by a 1) goes from 0 to 4 high (out of range) in a row, to 2 high in a row, to a single high. Likewise the information can be seen in the Current High and Current low sequences.

A voltage island power switch could be shown in the following sequence where a first switch takes place at the left side of the sequence and a second switch takes place at the asterisk.

Switchpoint=*
History: 0 0 1 1 1 1 0 1 1 0 1 0 0 0 0 0 0 0 0 0 0*0 0 1 1 1 1 0 1 1 0 1
Current High: 0 0 0 1 1 0 0 1 0 0 0 0 0 0 0 0 0 0 0 0 0 0 1 1 0 0 1 0 0 0
Current Low: 0 1 1 0 0 0 1 0 0 1 0 0 0 0 0 0 0 0 0 0 0 1 1 0 0 0 1 0 0 1 0

The second set of oscillations comes from the power island switching.

A simple way to find the history of an individual point is to add a resettable counter to the output of the above diagram. This is shown in FIG. 5, in which the left side of the figure is the same as corresponding portions of FIG. 4 and a counter is triggered on the right side when the measure point is within the permitted range.

This counter is reset every time the voltage at the measurement point goes outside of the range limits set by the comparators. When the voltage is within the limits the counter is not reset and the counter counts at every clock cycle. Thus the count will describe the amount of time that the voltage has been maintained in the valid range. The clock can be any clock available on the die with the period known and used in any control mechanism.

Figure 5:
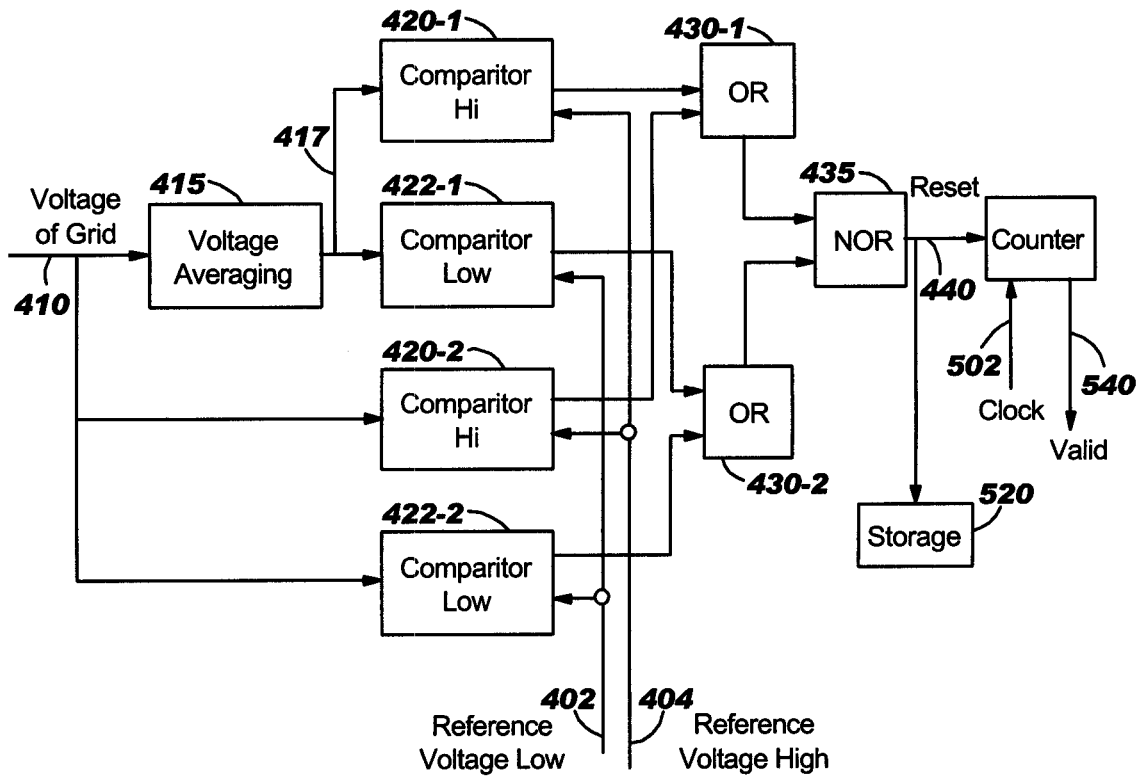
FIG. 5 shows a counter circuit for testing for a valid switching time.

Box 520 in FIG. 5 represents a fine-grained storage module such as a stack register or FIFO register provides a detailed history of the grid voltage using any of the systems disclosed.

An additional method of doing the measurement could be accomplished with one of the following circuits.

1) Using a ring oscillator with a counter. The oscillator would generate a frequency output that would be dependent on the voltage of the power grid.

2) Using a delay line with a tap that allows the output tap position to be dependent on the voltage grid.

3) Feed the output of the circuit of FIG. 5 to a FIFO register of appropriate length that preserves the history of the last K measurements and overwrites older measurements.

4) Using an analog to digital convertor that would read the voltage and communicate the voltage value to the central control device.

Conventional readout circuitry will pass the stored values to the controller for printout for human analysis or for further data processing.

The problem of analyzing multiple measurement sites and then determining if the voltage grid can withstand the switching becomes a larger problem. The magnitude of the switching (e.g. the capacitance of the kth island being switched) and the values at different sites become a factor in reaching a decision. In this type of system, the physical location of voltage islands and measurement points as well as the perturbation factor of a particular island, are all factors required before reaching a decision.

Diagnosis of acceptable and unacceptable switching times can be included as part of the characterization process. The chip is started up and a set of test vectors are executed, in which each test vector turns on or off a selected island. The grid voltage history will be recorded both before and after the switch. Standard statistical processes are then applied to define an acceptable pre-switch condition for each island; e.g. an approved range of pre-switch conditions that produce a post-switch grid voltage within an acceptable range; e.g. if the grid has been within the approved range for L clock cycles, then it is okay to switch.

For example, a large island might have a condition that: a) the grid voltage has been within range for N1 clock cycles AND b) the current condition is that no part of the grid is high (or low). The choice of high or low in the preceding sentence will depend on whether the island is being switched on or off.

A small island might have a condition that: a) the grid voltage is currently within range in the neighborhood of the island AND b) the current status of remote portions of the grid and the past status of the grid is unimportant. Neighborhood means islands that have an effect on the kth island that is greater than a threshold amount, and are not necessarily adjacent to the Kth island.

An intermediate island might have a condition that: a) the grid voltage has been within range for N2 (N2 being less than N1) clock cycles AND b) the current condition is that the neighborhood part of the grid is not out of range.

It will be a design choice for the chip designer whether to have a set of switching criteria (rules) that are uniform for all islands or to have a finer-grained set of rules for large and small islands.

In each of the preceding examples, the action taken when the criterion is not met is to postpone the switch until the criterion is met (or to postpone by a default amount of time).

Alternatively, the action taken may be to desensitize the most susceptible islands by reducing the clock speed and/or inserting pauses (no-operation commands) of those islands, assuming that the system design of the integrated circuit permits such actions.

Controller 310 of FIG. 3 may be a central controller for controlling all islands on the chip. Alternatively, there may be local controllers that control a subset of islands in situations where some areas of the chip have little effect on other areas. In a particular example, a controller controls a single island. There may be several island-specific controllers on a chip, as well as local controllers that control a limited number of islands.

Figure 6:
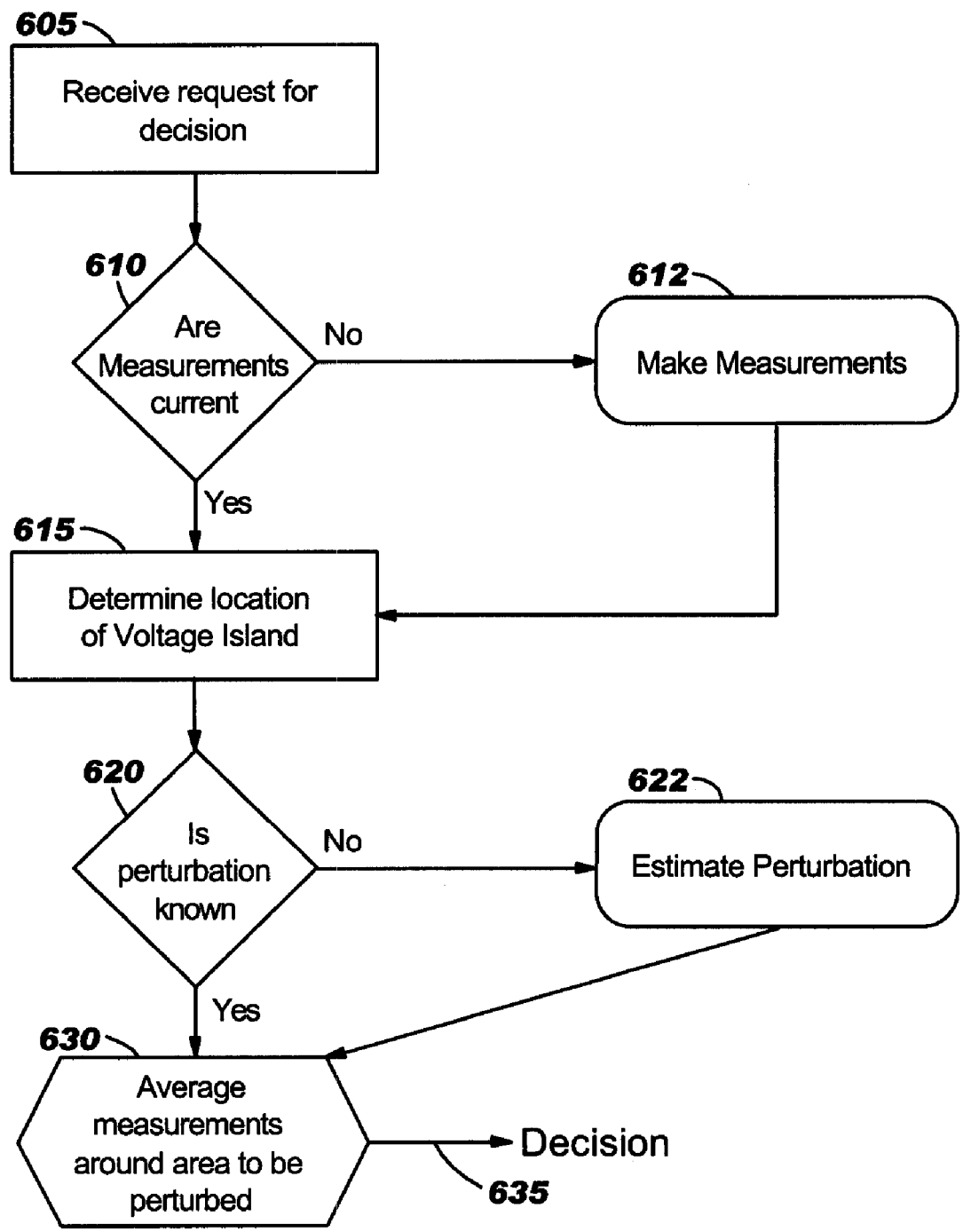
FIG. 6 shows a flow chart for making a decision to switch.

FIG. 6 illustrates a process according to the invention, in which:

The process starts with box 605 with a request for permission to make a switch (on or off);

The next step is to check if all the measurements are current (diamond 610). This step will be used when it takes a significant amount of time to test all the measurement points on the grid or when the measurement process is not continuous, but takes place only intermittently;

If current measurements are not available, they are updated (box 612);

Having updated the measurements, the location of the voltage island to be switched is determined in box 615, since the effect will depend on which island is being switched;

Given the location of the island and the current status of the grid, is the effect of the switch known (or estimated)—(diamond 620);

If the effect of the switch has not been measured or simulated, an estimate is made (box 622);

Lastly, the measurements or estimates of the effect of the switch on the grid are assembled from storage or from current data (box 612);

A decision is then made whether to proceed immediately; to wait or to take compensatory action.

While the invention has been described in terms of a single preferred embodiment, those skilled in the art will recognize that the invention can be practiced in various versions within the spirit and scope of the following claims.

What is claimed is:

1. A method of controlling at least one voltage level across a distributed power grid within an integrated circuit having a set of independently switchable voltage islands comprising the steps of:
   providing a plurality of voltage sensors connected to different locations in said power grid;
   coupling to said plurality of voltage sensors a plurality of storage means adapted to store sequentially a set of N voltage values such that said plurality of storage means store N sequential grid voltage values from said plurality of voltage sensors;
   providing a controller for controlling said independently switchable voltage islands, said controller being coupled to each of said plurality of voltage sensors and to said plurality of storage means, said controller being adapted to respond to a request to switch a Kth voltage island by switching said Kth voltage island at a time such that a grid voltage level at a reference location is within a specified range.

2. A method according to claim 1, in which said controller applies a test in response to said request, said test being based on a criterion including a current grid voltage and a history of said grid voltage.

3. A method according to claim 2, in which said criterion includes an acceptable range for said current grid voltage and for said history of said grid voltage.

4. A method according to claim 2, in which said criterion is based on a characterization process combining the results of a set of test vectors that cause individual islands to be switched.

5. A method according to claim 2, in which said criterion includes current and historical grid voltages of an island in the neighborhood of said Kth island.

6. A method according to claim 2, in which said criterion includes an acceptable range for said current grid voltage and for said history of said grid voltage in a voltage island in the neighborhood of said Kth voltage island.

7. An integrated circuit having a distributed power grid and a set of independently switchable voltage islands connected to the power grid and controlled by at least one controller:
   providing a plurality of voltage sensors connected to different locations in said power grid;
   a plurality of storage means adapted to store sequentially a set of N voltage values coupled to said plurality of voltage sensors such that said plurality of storage means store N sequential grid voltage values from said plurality of voltage sensors;
   at least one controller connected to at least one of said independently switchable voltage islands, said controller being coupled to at least one of said plurality of voltage sensors and to at least one corresponding storage means, said controller being adapted to respond to a request to switch a Kth voltage island by switching said Kth voltage island at a time such that a grid voltage level at a reference location is within a specified range.

8. An integrated circuit according to claim 7, in which said at least one controller comprises a set of individual controllers connected to a single one of said set of voltage islands.

9. An integrated circuit according to claim 8, further comprising at least one group controller connected to a plurality of said set of voltage islands.

10. An integrated circuit according to claim 9, in which said controller applies a test in response to said request, said test being based on a criterion including a current grid voltage and a history of said grid voltage.

11. An integrated circuit according to claim 10, in which said criterion includes an acceptable range for said current grid voltage and for said history of said grid voltage.

12. An integrated circuit according to claim 10, in which said criterion is based on a characterization process combining the results of a set of test vectors that cause individual islands to be switched.

13. An integrated circuit according to claim 10, in which said criterion includes an acceptable range for said current grid voltage and for said history of said grid voltage in a voltage island in the neighborhood of said Kth voltage island.

14. An integrated circuit according to claim 7, further comprising at least one group controller connected to a plurality of said set of voltage islands.

15. An integrated circuit according to claim 7, further comprising one island controller connected to all of said set of independently switchable voltage islands.

16. An integrated circuit according to claim 7, in which said controller applies a test in response to said request, said test being based on a criterion including a current grid voltage and a history of said grid voltage.

17. An integrated circuit according to claim 16, in which said criterion includes an acceptable range for said current grid voltage and for said history of said grid voltage.

18. An intergrated circuit according to claim 16, in which said criterion is based on a characterization process combining the results of a set of test vectors that cause individual islands to be switched.

19. An integrated circuit according to claim 16, in which said criterion includes current and historical grid voltages of an island in the neighborhood of said Kth island.

20. A method according to claim 16, in which said criterion includes an acceptable range for said current grid voltage and for said history of said grid voltage in a voltage island in the neighborhood of said Kth voltage island.

* * * * *